(12) United States Patent
Forrest et al.

(10) Patent No.: US 6,582,336 B2
(45) Date of Patent: Jun. 24, 2003

(54) ELECTROMAGNETICALLY-ACTUATED LIMITED SLIP DIFFERENTIAL

(75) Inventors: James L. Forrest, Ashley, IN (US); Robert Leeper, Fort Wayne, IN (US); James P. Scott, Fort Wayne, IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 10/090,666

(22) Filed: Mar. 5, 2002

(65) Prior Publication Data

US 2002/0132693 A1 Sep. 19, 2002

Related U.S. Application Data (60) Provisional application No. 60/275,978, filed on Mar. 14, 2001.

(51) Int. Cl.[7] ............................................. F16H 48/22
(52) U.S. Cl. ....................................................... 475/150
(58) Field of Search ................................. 475/150, 234, 475/235

(56) References Cited

U.S. PATENT DOCUMENTS 6,309,320 B1 * 10/2001 Forrest et al. .............. 475/150

* cited by examiner

Primary Examiner—Dirk Wright
(74) Attorney, Agent, or Firm—Baker & Daniels (57) ABSTRACT

A differential assembly including a rotatable casing, first and second axially moveable side gears disposed within the casing, at least one pinion gear disposed within the casing and intermeshed with the side gears, a cone clutch operatively coupled to the first side gear, the cone clutch being frictionally coupled to the casing in response to being exposed to a magnetic field, and a disc clutch having at least one clutch disc operatively coupled to the second side gear in response to axial movement of the second side gear.

13 Claims, 7 Drawing Sheets

ELECTROMAGNETICALLY-ACTUATED LIMITED SLIP DIFFERENTIAL

BACKGROUND OF THE INVENTION

The present invention relates to limited slip differentials, and more particularly to limited slip differentials having an electromagnetically actuated clutch.

Differentials are well known in the prior art and allow each of a pair of output shafts or axles operatively coupled to a rotating input shaft to rotate at different speeds, thereby allowing the wheel associated with each output shaft to maintain traction with the road while the vehicle is turning. Such a device essentially distributes the torque provided by the input shaft between the output shafts.

The completely open differential, i.e., a differential without clutches or springs which restrict relative rotation between the axles and the rotating differential casing, is not well suited to slippery conditions in which one driven wheel experiences a much lower coefficient of friction than the other driven wheel: for instance, when one wheel of a vehicle is located on a patch of ice and the other wheel is on dry pavement. Under such conditions, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior means for limiting slippage between the axles and the differential casing use a frictional clutch mechanism, either clutch plates or a frustoconical engagement structure, operatively located between the rotating case and the axles. Certain embodiments of such prior means provide a clutch element attached to each of the side gears, and which frictionally engages a mating clutch element attached to the rotating casing or, if the clutch is of the conical variety, a complementary interior surface of the casing itself. Such embodiments may also include a bias mechanism, usually a spring, to apply an initial preload between the clutch and the differential casing. By using a frictional clutch with an initial preload, a minimum amount of torque can always be applied to a wheel having traction, e.g., a wheel located on dry pavement. The initial torque generates gear separating forces between the first pinion gears and the side gears intermeshed therewith. The gear separating forces urge the two side gears outward, away from each other, causing the clutch to lightly engage and develop additional torque at the driven wheels. Examples of such limited slip differentials which comprise cone clutches are disclosed in U.S. Pat. No. 4,612,825 (Engle), U.S. Pat. No. 5,226,861 (Engle) and U.S. Pat. No. 5,556,344 (Fox), each of which is assigned to Auburn Gear, Inc., the disclosures of which are all expressly incorporated herein by reference.

Certain prior art limited slip differentials provide, between the first of the two side gears and its associated clutch element, interacting camming portions having ramp surfaces or ball/ramp arrangements. In response to an initiating force, this clutch element is moved towards and into contact with the surface against which it frictionally engages, which may be a mating clutch element attached to the casing, or an interior surface of the casing itself, as the case may be, thereby axially separating the clutch element and its adjacent first side gear, the interacting camming portions slidably engaging, the rotational speed of the clutch element beginning to match that of the differential casing due to the frictional engagement. Relative rotational movement between the ramp surfaces induces further axial separation of the clutch element and the first side gear. Because the clutch element is already in abutting contact with the surface against which it frictionally engages, the first side gear is forced axially away from the clutch element by the camming portions.

Certain embodiments of such limited slip differentials utilize an electromagnet having an electrical coil to effect the initiating force and actuate the clutch, as disclosed in U.S. Pat. No. 5,989,147 (Forrest et al.), U.S. Pat. No. 6,019,694 (Forrest et al.), and U.S. Pat. No. 6,165,095 (Till et al.), each of which is assigned to Auburn Gear, Inc., the disclosures of which are all expressly incorporated herein by reference. Each of these references discloses that the differential casing, in which the clutches are disposed, rotates within the housing and is rotatably supported by a pair of bearings. An electromagnet, which actuates a primary cone clutch element, is mounted in fixed relationship to the axle housing and is rotatably supported by the differential casing. Alternatively, as disclosed in pending U.S. patent application Ser. No. 09/484,967, filed Jan. 18, 2000, which is assigned to Auburn Gear, Inc., the disclosure of which is expressly incorporated herein by reference, the electromagnet may be fixedly supported by the axle housing. In either case, activation of the electromagnet draws a primary cone clutch element into frictional engagement with the rotating differential housing.

The camming portions, described above, act between the primary cone clutch element and the first side gear to axially separate them, forcing the first side gear into abutment with a transfer block located intermediate the first and second side gears. Responsive to this force, the transfer block is moved into abutment with the second side gear, which is rotatably fixed to a secondary cone clutch element, which frictionally engages a mating interior surface of the rotating differential casing. The frictional engagement of the secondary cone clutch element and the differential casing effects further clutched engagement between the axles and the differential casing, enhancing the locking capability of the limited slip differential. Notably, the load carrying capability of the secondary cone clutch mechanism is usually significantly greater than that of the primary cone clutch mechanism, owing to a greater axial engagement force exerted thereon. Examples of prior limited slip differentials are described in more detail below, with reference to FIGS. 1 and 2.

Figure 1:
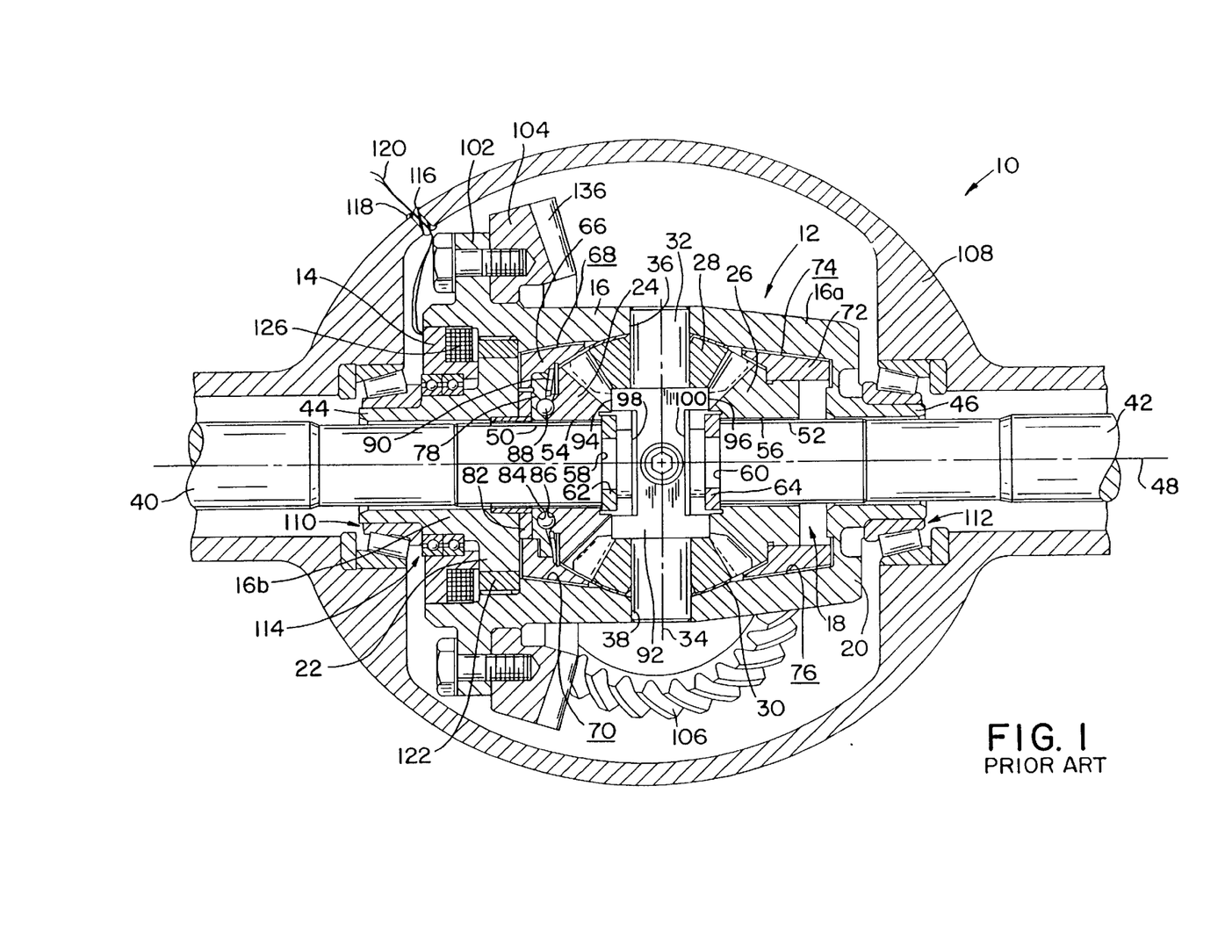
FIG. 1 is a sectional side view of a first embodiment of a prior art electrically actuated limited slip axle assembly having its clutch-activating electromagnet rotatably supported on the differential casing by a separate bearing.

FIG. 1 depicts an embodiment of prior axle assembly 10 having electrically or electromagnetically actuated limited slip differential assembly 12. Axle assembly 10 may be a conventional axle assembly or comprise part of a transaxle assembly. Therefore, it is to be understood that the term "axle assembly" encompasses both conventional (rear wheel drive) axle assemblies as well as transaxle assemblies. Differential assembly 12 comprises electromagnet 14, ferrous rotatable casing 16 constructed of joined first and second casing parts 16a and 16b, respectively, and providing inner cavity 18, which is defined by the interior surface of the circumferential wall portion of first casing part 16a and end wall portions 20, 22 of first and second casing parts 16a, 16b, respectively. Casing part 16a may be a machined iron or steel casting; casing part 16b may also be such a casting, or a ferrous, sintered powdered metal part. Disposed within cavity 18 are side gears 24, 26 and pinion gears 28, 30. The teeth of the side gears and pinion gears are intermeshed, as shown. Pinion gears 28, 30 are rotatably disposed upon cylindrical steel cross pin 32, which extends along axis 34. The ends of cross pin 32 are received in holes 36, 38 diametrically located in the circumferential wall of casing part 16a.

Axles 40, 42 are received through hubs 44, 46, respectively formed in casing end wall portions 20, 22, along common axis of rotation 48, which intersects and is perpendicular to axis 34. Axles 40, 42 are respectively provided with splined portions 50, 52, which are received in splines 54, 56 of side gears 24, 26, thereby rotatably fixing the side gears to the axles. The axles are provided with circumferential grooves 58, 60 in which are disposed C-rings 62, 64, which prevent the axles from being removed axially from their associated side gears. The terminal ends of the axles 98 and 100 may abut against the cylindrical surface of cross pin 32, thereby restricting the axles' movement toward each other along axis 48.

Primary clutch element 66 is attached to side gear 24 and rotates therewith. Clutch element 66 is ferrous and of the cone clutch variety and has frustoconical surface 68 which is adjacent to, and clutchedly interfaces with, complementary surface 70 provided on the interior of casing part 16a. Secondary clutch element 72 is also of the cone clutch variety and has frustoconical surface 74 which is adjacent to, and clutchedly interfaces with, complementary surface 76 also provided on the interior of casing part 16a. Cone clutches 66 and 72 may be of the type described in U.S. Pat. No. 6,076,644 (Forrest et al.) or U.S. Pat. No. 6,261,202, each of which is assigned to Auburn Gear, Inc., the disclosures of which are both expressly incorporated herein by reference, or may also be of any other suitable structure.

Disposed between primary cone clutch element 66 and side gear 24 is annular cam plate 78, which abuts thrust washer 82 adjacent end wall portion 22. Ball and ramp arrangement 84, 86, 88 is comprised of a first plurality of paired spiral slots 84, 86 located in cam plate 78 and primary cone clutch element 66, respectively. Slots 84, 86 define a helically ramping path followed by ball 88, which may be steel, disposed in each slot pair and a first ramp angle. With electromagnet 14 de-energized, balls 88 are seated in the deepest portion of slots 84, 86 by Belleville spring 90. The actuation sequence is created by the momentary difference in rotational speed between cone clutch element 66 and cam plate 78 as frustoconical surfaces 68 and 70 seat against each other. A more detailed discussion of ball/ramp camming arrangements is disclosed in U.S. Pat. No. 5,989,147.

In operation, a variable coil current on electromagnet 14 induces a variable amount of magnetic clamping force between casing part 16a and primary cone clutch element 66, which induces a variable amount of torque to be exerted by casing part 16a on clutch element 66. As electromagnet 14 is activated, axial separation of primary cone clutch element 66 and cam plate 78 is induced as cone clutch element 66 is magnetically pulled to the left against the force of Belleville spring 90 into clutched engagement with casing part 16a through frustoconical surfaces 68 and 70. In response to the initial flow of magnetic flux, cone clutch element 66 is pulled by the magnetic field to the left and surfaces 68 and 70 abut, and enter frictional engagement. As cone clutch element 66 and cam plate 78 separate axially, balls 88 are caused to rotate along the ramping helical paths of slots 84, 86 due to the relative rotation between clutch element 66 and cam plate 78. Cam plate 78 is urged against thrust washer 82 by the force of Belleville spring 90 and gear separation forces between pinion gears 28, 30 and side gear 24. As balls 88 rotate further along the helical ramp paths, frustoconical surfaces 68, 70 are forced into tighter frictional engagement and cam plate 78, still abutting thrust washer 82, reaches the end of its rotational travel relative to cone clutch member 66.

First side gear 24 moves towards the right, forcing secondary cone clutch element 72 into abutment with casing part 16a via transfer block 92 and second side gear 26 in the manner described above. Transfer block 92, which may be steel, is disposed about cross pin 32 and adapted to move laterally relative thereto along axis 48 to transfer movement of first side gear 24 to second side gear 26, thereby engaging secondary clutch element 72. As shown, transfer block 92 is attached directly to cross pin 32, and supports the cross pin in position within the differential casing as described in U.S. Pat. No. 6,254,505, assigned to Auburn Gear, Inc., the disclosure of which is expressly incorporated herein by reference. Alternatively, the transfer block may be loosely fitted about the cross pin, the cross pin being directly attached to the differential housing by a bolt extending through one end of the cross pin, as shown, for example, in U.S. Pat. No. 5,226,861. The shear loads associated with torque transmission are exerted on cross pin 32 near its opposite ends, particularly between the circumferential wall of casing part 16a and the adjacent pinion gears 28, 30.

Transfer block 92 includes opposite bearing sides 94, 96 which respectively abut first and second side gears 24, 26, and allows terminal ends 98, 100 of axles 40, 42, respectively, to abut the cylindrical side surface of cross pin 32. Transfer block 92 moves laterally relative to cross pin 32, along axis 48, such that rightward movement of side gear 24, described above, is transferred to side gear 26. Thus, during actuation of electromagnet 14, first side gear 24 is urged rightward, as viewed in FIG. 1, into abutting contact with transfer block 92. Transfer block 92 moves rightward, into abutting contact with second side gear 26; and second side gear 26 moves rightward, urging surface 74 of secondary clutch element 72 into frictional engagement with surface 76 of casing part 16a, thereby providing additional torque transfer capacity to the differential than would otherwise be provided with single cone clutch element 66.

Provided on the exterior surface of casing part 16a, near electromagnet 14, is flange 102, to which ring gear 104 is attached. The teeth 136 of ring gear 104 are in meshed engagement with the teeth of pinion gear 106 which is rotatably driven by an engine (not shown), thus rotating differential casing 16 within axle housing 108. As casing 16 rotates, the sides of holes 36, 38 bear against the portions of the cylindrical surface of cross pin 32 in the holes. The rotation of cross pin 32 about axis 48 causes pinion gears 28, 30 to revolve about axis 48. The revolution of the pinion gears about axis 48 causes at least one of side gears 24, 26 to rotate about axis 48, thus causing at least one of axles 40, 42 to rotate about axis 48. Engagement of the clutches as described above arrests relative rotation between the side gears and the differential casing.

Differential casing 16 is rotatably supported within axle housing 108 by means of identical first and second bearings 110, 112. Because of the proximity of ring gear flange 102 to the end of casing 16 nearest first bearing 110, in operation, that bearing is more heavily loaded than is second bearing 112.

Electromagnet 14 is rotatably supported on second differential casing portion 16b by third bearing 114. Electromagnet 14 is rotatably fixed relative to axle housing 108 and disposed in close proximity to casing 16, which rotates relative thereto. The voltage applied to electromagnet 14 to energize same and actuate primary clutch element 66 may be controlled by a control system (not shown) which is in communication with sensors (not shown) which indicate, for example, excessive relative rotation between axles 40, 42, and thus the need for traction control. Housing 108 includes hole 116 fitted with rubber grommet 118 through which extend leads 120. Through leads 120 the control system provides voltage to electromagnet 14. As electromagnet 14 is energized, a magnetic initiating force is applied to primary cone clutch element 66 by a toroidal electromagnetic flux path (not shown) which is established about the annular electromagnet coil 126; the flux path flows through ferrous casing portions 16a and 16b and through clutch element 66. Clutch element 66 is thus magnetically drawn into engagement with casing 16 during operation of electromagnet 14. Because it is made of a magnetic material (e.g., steel) and has a solid structure, primary cone clutch element 66 is better suited for conducting the magnetic flux path therethrough than would be a clutch comprising a series of interleaved discs, which may have gaps therebetween and which would likely be formed of materials which would not so readily transmit the magnetic flux. Further, casing part 16b may include annular nonmagnetic portion 122 to help direct the toroidal magnetic flux path through primary cone clutch element 66, as described in U.S. Pat. No. 6,019,694 (Forrest et al.), assigned to Auburn Gear, Inc., the disclosure of which is expressly incorporated herein by reference.

Figure 2:
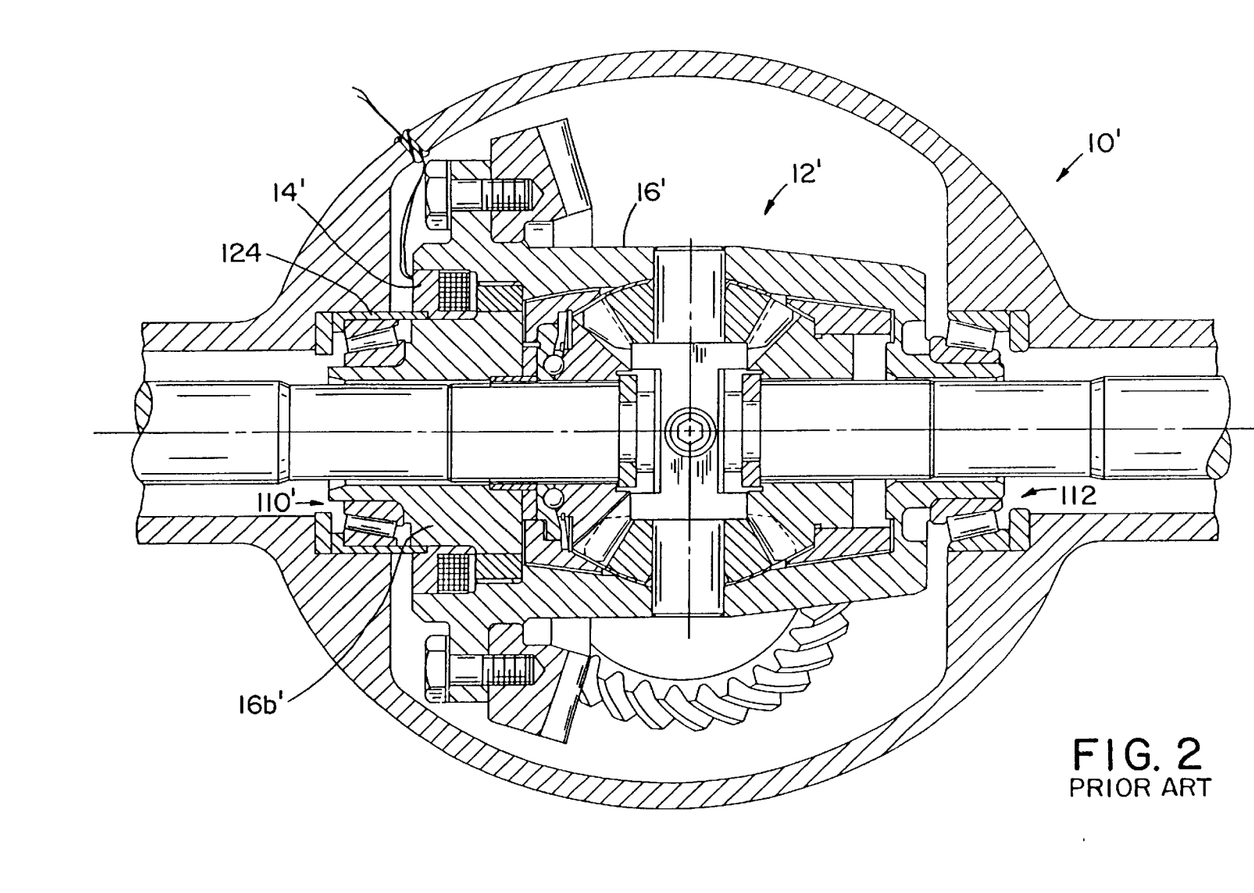
FIG. 2 is a sectional side view of a second embodiment of a prior art electrically actuated limited slip axle assembly having its clutch-activating electromagnet rotatably supported by an extended bearing cup of a bearing which supports the differential casing within the axle housing.

FIG. 2 depicts a second embodiment of a prior axle assembly which is identical in structure and operation to the above-described axle assembly 10 except as follows: Axle assembly 10' comprises electromagnet 14' which is fixed to the axle housing, rather than being rotatably supported by a bearing 114 disposed about casing part 16b. Bearing 110' is disposed in cup 124 which extends inwardly of the axle housing to engage and support electromagnet 14' in the manner described in pending U.S. patent application Ser. No. 09/484,967, filed Jan. 18, 2000. Notably, bearing 110' is somewhat smaller than bearing 110 (and identical bearing 112) and, as noted above, would be more heavily loaded during operation than larger bearing 112 due to the proximity of the ring gear.

Although cone clutches of the type disclosed above are better suited than disc-type clutches as primary clutch elements in electromagnetically-actuated limited slip differentials, for the reasons set forth above, their load carrying capability is limited, for a give axial engagement force, by the angle of the included angle formed by the cone clutch engagement surfaces. Typically, these angles range from 9° to 12.5°. The smaller this angle, the greater the torque capacity of the cone clutch. The smaller this angle, however, the harsher the clutch engagement, and the smaller the tendency for the clutch to release. Clutches having multiple interleaved discs, or "clutch packs," are well known in the art and generally have greater torque capacity than a cone clutch of approximately equal package size. Moreover, the required tolerances associated with manufacturing cone clutches tend to be somewhat smaller than with disc clutches.

Further still, compared to the axial movement needed to engage disc clutches, a greater distance is needed when using cone clutches because a portion of the movement is absorbed by the casing as it is being radially stretched. Therefore, relatively more movement between the pinion and side gears is needed to accommodate proper movement of the cone clutch, and optimal gear mesh clearances therebetween, which are on the order of ±0.010 inch, may be compromised. An electromagnetically-actuated limited slip differential assembly which provides the respective benefits of cone clutches and clutch packs is highly desirable.

A further issue associated with electromagnetically-actuated limited slip differentials is that the electromagnet tends to magnetize ferrous components within the axle housing, particularly those in close proximity to the electromagnet. This can be of particular concern where relatively moving, interengaging components such as bearings or gears of the differential or axle assembly become magnetized and attract metal shavings or other ferrous debris, or where the shavings and debris are themselves magnetized and become attached to these interengaging components. The collection of such contamination on these components can substantially accelerate their wear and lead to premature failure.

One known approach to addressing this issue is to provide a magnetic drain plug in the axle housing, which may attract and retain some of the debris. However, the debris may be equally attracted to other magnetized components within the axle housing, rather than to only the drain plug. Another approach to addressing this issue is described in U.S. Pat. No. 6,165,095, which discloses an apparatus and method for demagnetizing the components initially magnetized by the electromagnet. While effective, this means for demagnetization involves providing additional controls for directing current through the electromagnet(s). It is desirable to provide a simple and effective means for reducing the likelihood or severity of magnetization of at least some of the relatively moving, interengaging components within the axle housing.

Further, one way to reduce the cost and improve the reliability of an axle assembly is to reduce the number of components parts, or at least the number of complex, high precision parts. For example, reducing the number of ball or roller bearings may reduce the cost of material, the cost of assembly labor, and the number of moving parts, thereby improving durability and reliability. Reduction in the number of parts, however, may compromise the ability of the remaining parts to perform satisfactorily. For example, reducing the number of bearings may increase the load to be borne by the remaining bearings, which may adversely affect the durability of those remaining bearings. The reduction of costs without compromising performance is an ongoing and important goal in virtually every commercial endeavor, and means for accomplishing that goal are therefore highly desirable.

SUMMARY OF THE INVENTION

The present invention provides a differential assembly including a rotatable casing, first and second axially moveable side gears disposed within the casing, at least one pinion gear disposed within the casing and intermeshed with the side gears, a cone clutch operatively coupled to the first side gear, the cone clutch being frictionally coupled to the casing in response to being exposed to a magnetic field, and at least one clutch disc operatively coupled to the second side gear in response to axial movement of the second side gear.

The present invention also provides a differential assembly including a rotatable casing having opposite ends, a differential gear mechanism and a magnetically-activated clutch disposed within the casing, relative rotation of at least a portion of the gear mechanism being selectively frictionally engaged with the casing by the clutch, an electromagnet being disposed proximal to one of the casing ends, and a ring gear attached to the casing at a location proximal to the other of the casing ends.

The present invention also provides a differential assembly including a rotatable casing, a differential gear mechanism and a magnetically-activated clutch disposed within the casing, relative rotation of at least a portion of the gear mechanism being selectively frictionally engaged with the casing by the clutch, an electromagnet disposed proximal to the casing, the casing and the electromagnet having relative rotation therebetween, and a self lubricating bearing disposed between the electromagnet and the casing, the electromagnet being supported relative to the casing by the bearing.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention in several forms, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Figure 3:
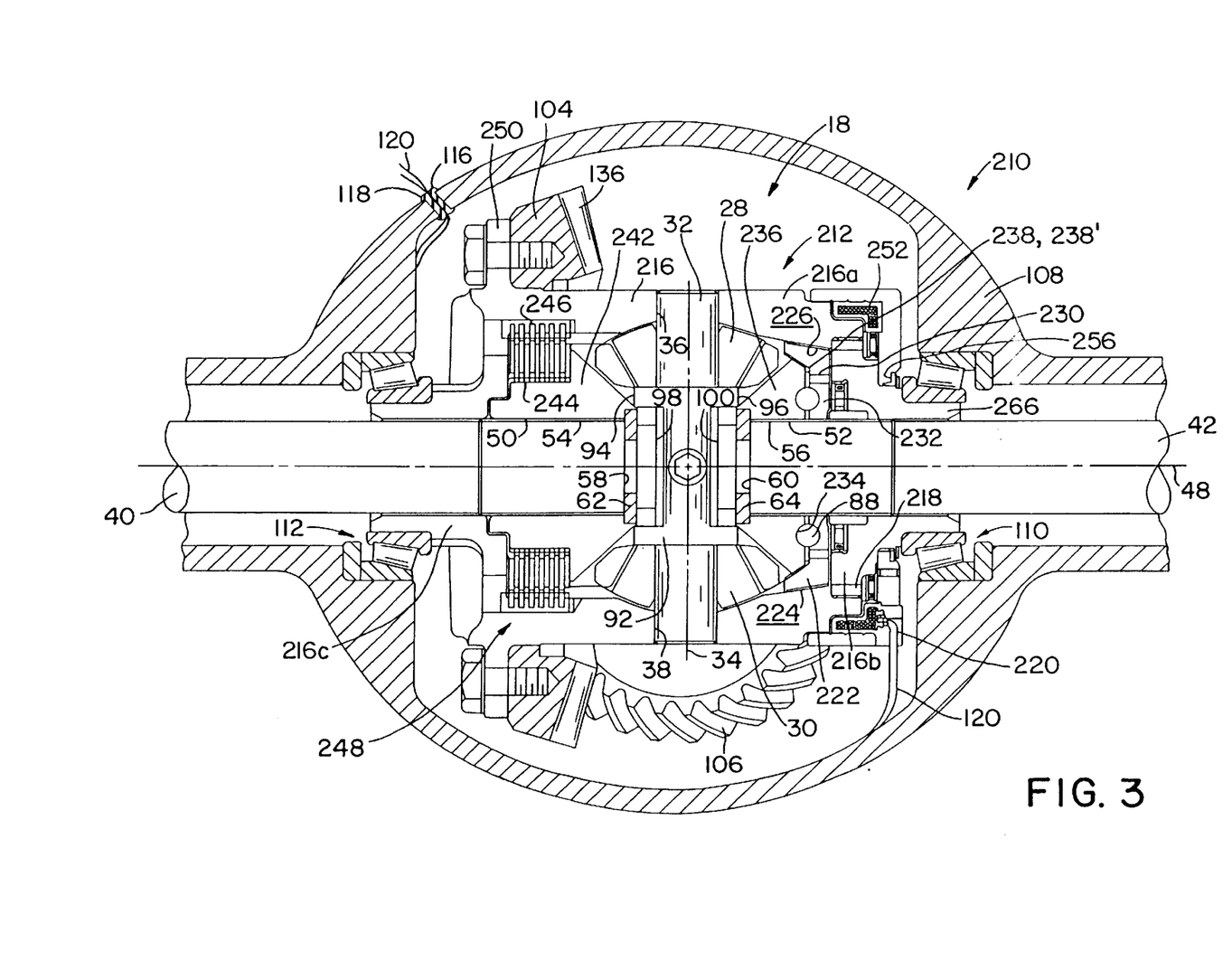
FIG. 3 is a sectional side view of a first embodiment of an electrically actuated limited slip axle assembly according to the present invention having its clutch-activating electromagnet rotatably supported on the differential casing by a separate bearing.
Figure 4:
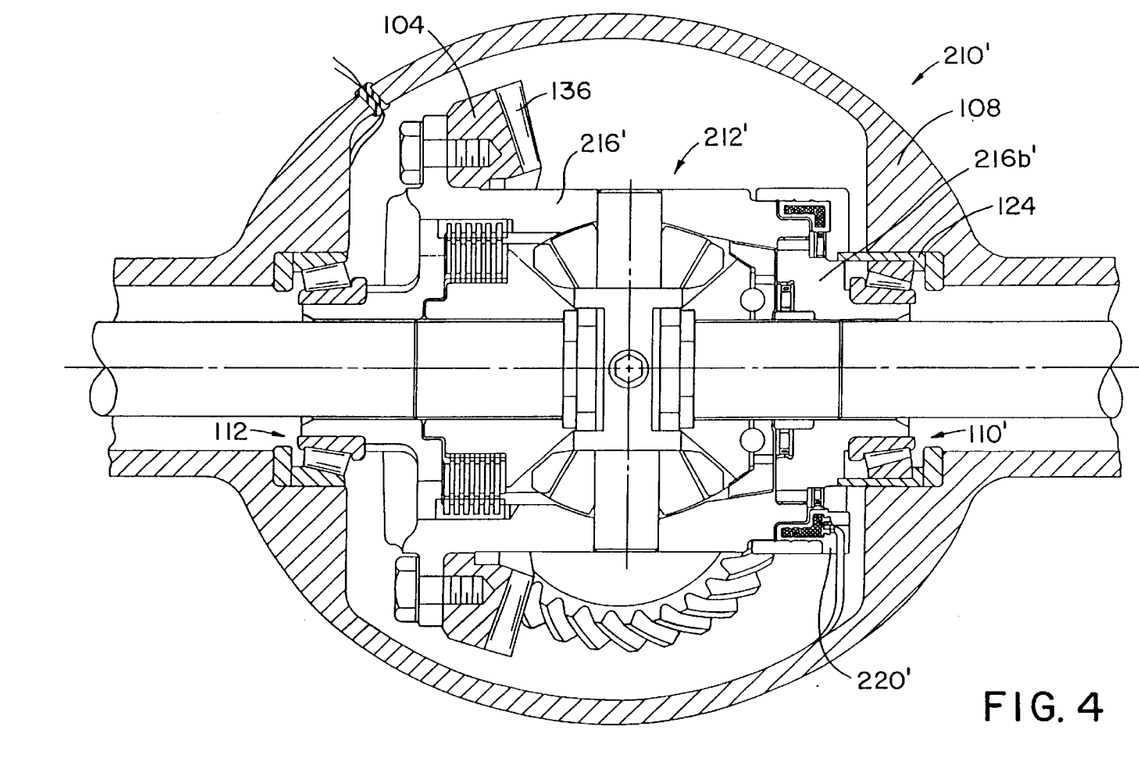
FIG. 4 is a sectional side view of a second embodiment of an electrically actuated limited slip axle assembly according to the present invention having its clutch-activating electromagnet rotatably supported by an extended bearing cup of a bearing which supports the differential casing within the axle housing.

FIGS. 3 and 4 respectively depict first and second embodiments of electrically or electromagnetically-actuated limited slip differentials according to the present invention. Axle assembly 210 (FIG. 3) is structurally and operationally similar to prior art axle assembly 10 (FIG. 1) except as described hereinbelow. Axle assembly 210' (FIG. 4) is structurally and operationally similar to prior art axle assembly 10' (FIG. 2) except as described hereinbelow. Identical parts between all of these axle assemblies are identically numbered.

Referring to FIG. 3, axle assembly 210 includes differential assembly 212 rotatable comprising casing 216. Casing 216 includes first, second and third parts 216a, 216b and 216c, respectively. At least casing parts 216a and 216b are ferrous, and may be machined iron or steel castings. Casing part 216b may be a sintered powdered metal part having nonmagnetic annular portion 218 to facilitate the proper magnetic flux path as described above.

Rotatably supported on casing 216 is electromagnet 220, which is rotatably fixed relative to axle housing 108. As described above, current is supplied to electromagnet 220 via leads 120.

Disposed within casing 216 and proximal to casing part 216b is primary clutch element 222 which is ferrous and of the cone clutch variety. In the manner described above, frustoconical surface 224 of cone clutch 222 is magnetically drawn into frictional engagement with complementary interior surface 226 of differential casing part 216a to initiate clutching and slows the relative rotation between casing 216 and cone clutch 222.

Figure 9A:
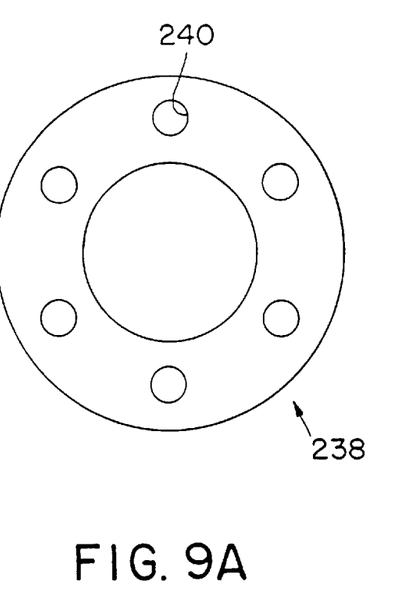
FIG. 9A is a plan view of a first embodiment of a ball spacer used in the axle assemblies of FIGS. 3 and 4.
Figure 9B:
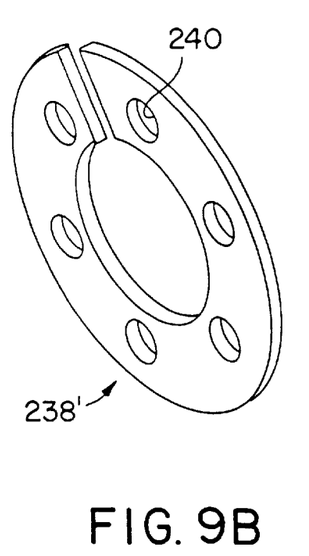
FIG. 9B is an oblique view of a second embodiment of a ball spacer used in the axle assemblies of FIGS. 3 and 4.

A ball/ramp arrangement comprising spiral slots 230 provided in planar portion 232 of primary cone clutch 222, spiral slots 234 provided in first side gear 236, and balls 88, act to axially force first side gear 236, which is rotatably coupled to axle 42 via interfitted splined portions 52 and 56 therein, leftward as viewed in FIG. 3. Ball spacer 238, also shown in FIGS. 9A and 9B, is provided between the interfacing axial surfaces of planar cone clutch element portion 232 and first side gear 236. Ball spacer 238 is flat and annular, and provided with a plurality of circumferentially distributed identically-sized holes 238 within which balls 88 are disposed; the diameter of holes 238 is slightly larger than the diameter of balls 88 to facilitate free movement of the balls through the holes. Spacer 238 maintains proper positioning of balls 88 as the interfacing axial surfaces of planar cone clutch element portion 232 and first side gear 236 separate, and ensures that all the balls transmit and equal force between all paired surfaces of slots 230 and 234. Should a ball 88 tend to lead or lag the revolution of the other balls 88 about axis 48, it will contact a side of its spacer hole 240 and be urged thereby back into its proper circumferential position. Proper positional relationship between the balls 88 is thus maintained at all times. Spacer 238 may be flat, stamped sheet steel part. Alternatively, the ball spacer may be formed as a steel Belleville spring as shown in FIG. 9B. Ball spacer 238' is provided with circumferentially distributed holes 240 like ball spacer 238 to maintain proper relative ball positions, but provides the additional function of facilitating the axial separation of primary cone clutch element 222 and first side gear 236 by urging them axially apart and more quickly effecting locking of the differential.

As first side gear 236 is moved leftward, as viewed in FIG. 3, it is brought into abutment with bearing side 96 of transfer block 92, which moves laterally relative to cross pin 32 as described above. Opposite transfer block bearing side 94 abuts second side gear 242, which is rotationally fixed to axle 40 via interfitted splined portions 50 and 54 therein. Leftward movement of second side gear 242 urges a plurality of interleaved discs 244, 246, which comprise secondary clutch 248, into mutual frictional engagement. Discs 244 are rotatably fixed to side gear 242, and discs 246 are rotatably fixed to casing 216; hence, their frictional engagement tends to slow their relative rotation, and lock the axle 40 into rotation with casing 216. Because axles 40 and 42 are connected through side gears 234, 242 and pinion gears 28, 30, once one axle is clutchedly engaged to casing 216, both axles are so engaged.

In marked distinction from the differentials shown in FIGS. 1 and 2, differential 212 provides ring gear mounting flange 250 at the axial end of casing 216 which is opposite that at which electromagnet 220 is located, thereby substantially decreasing the likelihood that ring gear 104 will become magnetized, and thus minimizing the possibility that magnetic shavings or other debris which may be in cavity 18 will come between the intermeshed teeth of ring gear 104 and pinion 106. As described above, the toroidal flux path about the annular electromagnet coil is directed through the adjacent portions of the ferrous casing parts, and the primary cone clutch. By greatly separating ring gear 104 from this flux path in accordance with the present invention, gear wear, and the durability of axle assembly 210 is improved vis-a-vis prior art electromagnetically-actuated limited slip axle assemblies which more proximally locate the ring gear and electromagnet.

FIG. 4 depicts a second embodiment of an axle assembly according to the present invention which is identical in structure and operation to above-described axle assembly 210 except as follows: Axle assembly 210 comprises electromagnet 220' which is fixed to the axle housing 108, rather than being rotatably supported about casing part 216b'. Bearing 110' is disposed in cup 124 which extends inwardly of the axle housing to engage and support electromagnet 220'. Notably, bearing 110' is somewhat smaller than bearing 112, or bearing 110 of FIG. 3. By moving the electromagnet to the axial end of casing 216' opposite that at which ring gear 104 is located, however, larger bearing 112, located near the ring gear 104, is more heavily loaded during operation.

Figure 5:
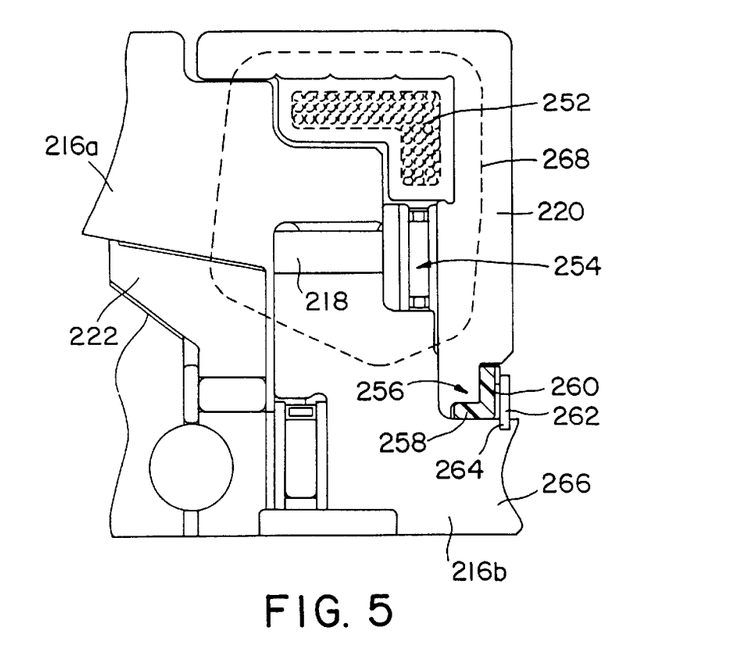
FIG. 5 is an enlarged, fragmentary view of the axle assembly of FIG. 3.

With reference now to FIGS. 5–8, there are shown various bearing means for axially and radially supporting electromagnet 220 in axle assembly 210. FIG. 5, which is an enlarged fragmentary view of FIG. 3, shows electromagnet 220 (which comprises coil 252) is separated from casing 216 by flat annular roller thrust bearing 254, and by annular bearing 256 molded of a self-lubricating, SP polyimide resin such as, for example, Vespel®, manufactured by DuPont. Bearing 256 has an L-shaped partial cross section providing integral cylindrical portion 258 and flat annular portion 260. Snap ring 262 disposed in annular groove 264 provided in hub 266 of casing part 216b retains electromagnet 220 to casing 216. Notably, line 268 indicates the toroidal magnetic flux path of electromagnet coil 252.

Figure 6:
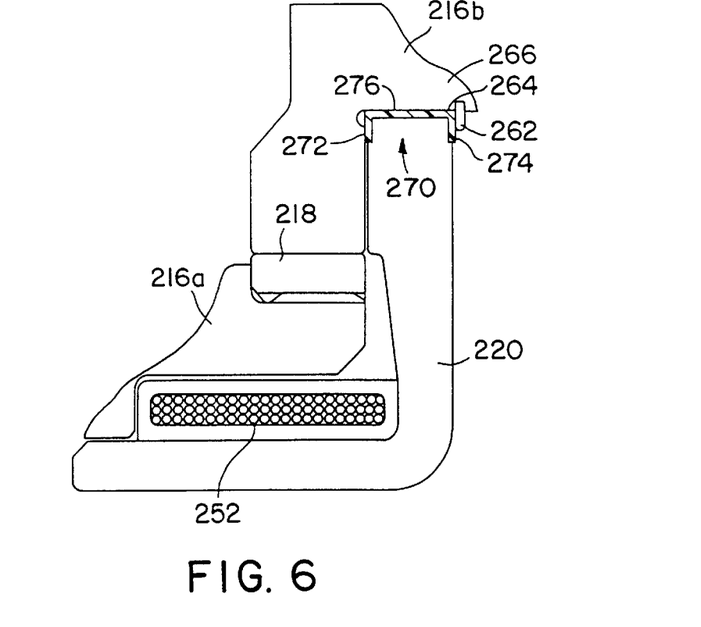
FIG. 6 is an enlarged, fragmentary view of an axle assembly according to a third embodiment of the present invention having its electromagnet supported by a self-lubricating bearing.

FIG. 6 shows an alternative to the electromagnet mounting scheme of FIG. 5 which eliminates roller thrust bearing 254, and replaces bearing 256 with bearing 270. Bearing 270, which may also be molded of Vespel®, has a U-shaped partial cross section providing integral annular flat portions 272 and 274 located on opposite sides of central cylindrical portion 276. Effectively, the function of roller thrust bearing 254 (FIG. 5) is performed by bearing portion 272.

Figure 7:
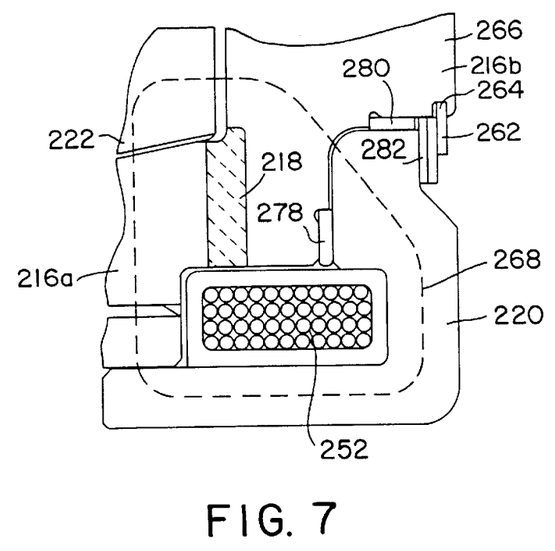
FIG. 7 is an enlarged, fragmentary view of an axle assembly according to a fourth embodiment of the present invention having its electromagnet supported by an alternative self-lubricating bearing.
Figure 8:
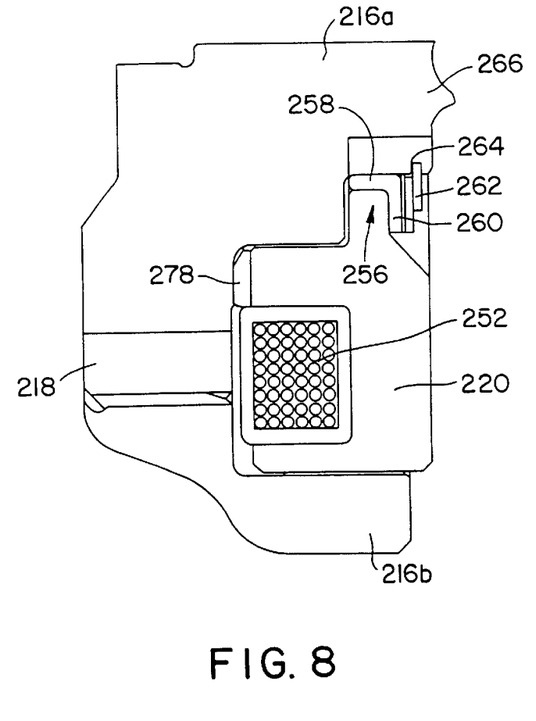
FIG. 8 is an enlarged, fragmentary view of an axle assembly according to a fifth embodiment of the present invention having its electromagnet supported by another alternative self-lubricating bearing.

FIG. 7 shows a further alternative to the electromagnet mounting scheme of FIG. 5 which eliminates roller thrust bearing 254, and replaces it with flat, annular Vespel® bearing 278. Further, bearing 256 (FIG. 5) is replaced with individual Vespel® bearings 280, 282 which are respectively substituted for portions 258 and 260 of bearing 256. Flat annular bearing 278 of FIG. 7, and annular L-shaped bearing 256 of FIG. 5, are both used in the variant shown in FIG. 8.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A differential assembly comprising:

a rotatable casing;

first and second axially moveable side gears disposed within said casing;

at least one pinion gear disposed within said casing and intermeshed with said side gears;

a cone clutch operatively coupled to said first side gear, said cone clutch adapted to be frictionally coupled to said casing in response to being exposed to a magnetic field; and a disc clutch having at least one clutch disc operatively coupled to said second side gear in response to axial movement of said second side gear.

2. The differential assembly of claim 1 wherein said disc clutch comprises a clutch disc pack having a plurality of interleaved clutch discs operatively coupled to said second side gear and a plurality of clutch discs operatively coupled to said rotatable casing.

3. The differential assembly of claim 1 including an electromagnet operatively connected to said cone clutch for generating a said magnetic field.

4. The differential assembly of claim 1 including a ring gear coupled to the same side of the rotatable casing at which said disc clutch is located; and an electromagnet operatively connected to said cone clutch for generating a said magnetic field.

5. The differential assembly of claim 4 including a bearing for mounting said electromagnet on said rotatable casing.

6. A differential assembly comprising:

a rotatable casing having two opposite ends;

a differential gear mechanism and a magnetically-activated clutch disposed within said rotatable casing, at least a portion of said gear mechanism being selectively frictionally engageable with said casing by means of said clutch;

an electromagnet disposed proximal to one of said casing ends; and a ring gear secured to said rotatable casing at a location proximal to the other of said casing ends.

7. The differential assembly of claim 6 including a disc clutch comprising a disc pack having a plurality of interleaved clutch discs operatively coupled to said second side gear and a plurality of discs operatively coupled to said rotatable casing.

8. A differential assembly comprising:

a rotatable casing having opposite ends;

a differential gear mechanism and a magnetically-activated cone clutch disposed within said rotatable casing, at least a portion of said gear mechanism being selectively frictionally engageable with said casing by means of said clutch;

an electromagnet disposed proximal to one of said casing ends; and a ring gear secured to said rotatable casing at a location proximal to the other of said casing ends.

9. The differential assembly of claim 8 and further including a disc clutch comprising a disc pack having a plurality of interleaved clutch discs operatively coupled to said second side gear and a plurality of clutch discs operatively coupled to said rotatable casing.

10. The differential assembly of claim 8 including an electromagnet operatively coupled to said cone clutch for generating a magnetic field to activate said cone clutch.

11. The differential assembly of claim 8 including a bearing for mounting said electromagnet on said rotatable casing.

12. A differential assembly comprising:

a rotatable casing;

a differential gear mechanism having first and second side gears disposed in said casing, a magnetically-activated cone clutch disposed within said casing, at least a portion of said gear mechanism being selectively frictionally engaged with said casing by said clutch, and a clutch disc pack having a plurality of interleaved clutch discs operatively coupled to said second side gear and a plurality of clutch discs operatively coupled to said rotatable casing;

an electromagnet disposed proximal to said casing, said casing and said electromagnet relatively rotatable with respect to each other; and a self lubricating bearing disposed between said electromagnet and said casing.

13. A differential assembly of claim 12 including a ring gear coupled to the same side of said rotatable casing as said clutch disc pack.

* * * * *